Figure 1:
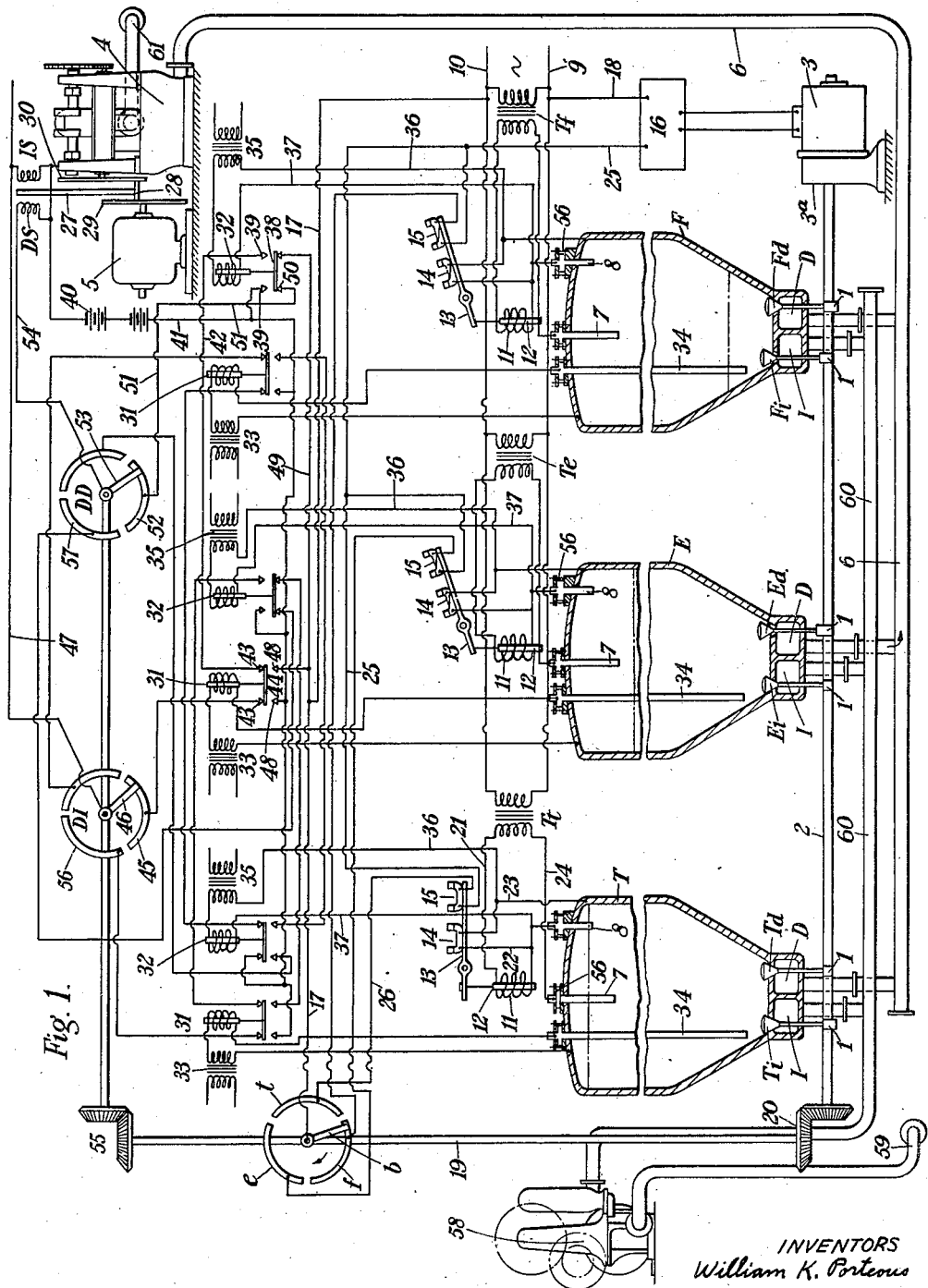

INVENTORS
William K. Porteous
William T. Marchment
By Ralph B. Stewart
ATTORNEY

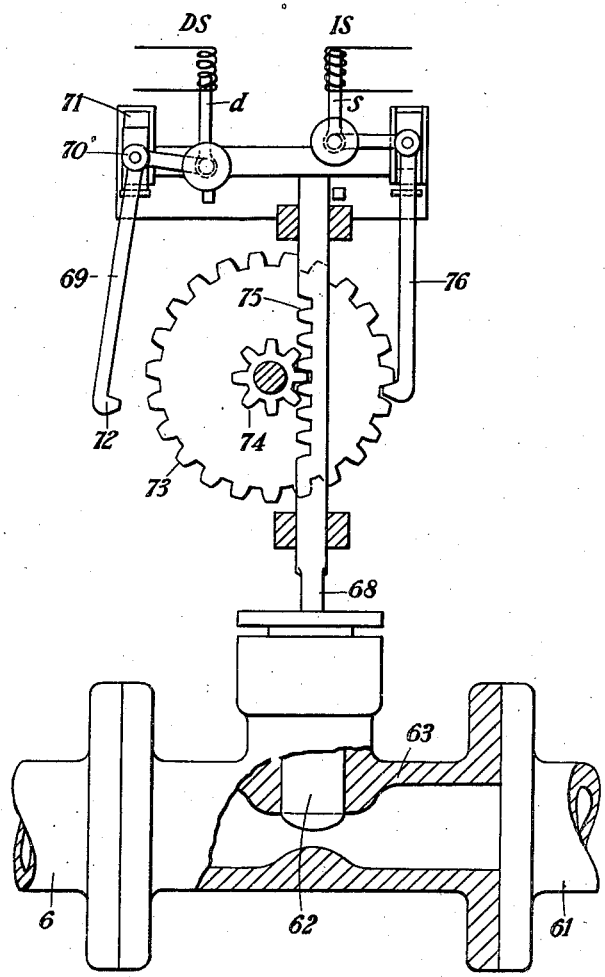

Patented Mar. 27, 1945

2,372,449

UNITED STATES PATENT OFFICE 2,372,449

CO-ORDINATED CONTROL OF CYCLICAL OPERATIONS ON FLUID AND LIKE MATERIALS

William King Porteous, London S. W. 1, and William Thomas Marchment, London W. 4, assignors of fifteen one-hundredths to Towler & Son, Ltd., Stratford, London, England, and eighty-five one-hundredths to said Porteous Application July 25, 1941, Serial No. 404,096
In Great Britain October 26, 1938

22 Claims. (Cl. 137—68)

The invention is concerned with apparatus and systems for carrying out controlled treatment in cyclic operations of fluid material and other material capable of flowing such as pulverulent or quasi-liquid material.

For some purposes, it is required to employ a plurality of tanks which have to be filled with liquid or other material capable of flowing and discharged at recurring intervals, and it is necessary to arrange for one tank to be filled while another is being emptied, and possibly for the contents of a further tank, at the same time, to undergo some form of treatment, each tank passing in turn through the same cycle of operations. A particular example is afforded by sewage treatment tanks, the arrangement being such that one tank remains filled for a prescribed period of time while its contents are undergoing treatment, this period representing the time required to empty a second tank and to fill a third tank. At the conclusion of the period in question, matters must be so arranged that the first-mentioned tank starts to empty and simultaneously the treatment commences for the other tank that has just been filled. The problem to be solved is that of co-ordinating the operations in the various tanks so that, for example, the emptying of one tank is completed practically simultaneously with the filling of another tank.

One of the objects of the present invention is to achieve co-ordinated control of cyclical operations carried out on fluid material in a plurality of tanks, whereby the same cycle of operations is performed with each tank, in turn, and the termination of one phase of the cycle for one tank is caused to take place substantially simultaneously with the commencement of another phase for at least one of the other tanks.

Another object of the invention is to control the change-over from one phase to another phase of the cycle of operations by means responsive to the attainment of a given high level by the material in one of the tanks which is being filled at any time.

A further important object of the invention is to provide means whereby the operation proceeding on the material in at least one of the tanks at any time may be either accelerated or retarded, as may be required, in order that completion of the operation in question shall occur substantially simultaneously with completion of another operation in one or more of the other tanks.

Another object of the invention is to provide co-ordinated control of the filling and emptying of a plurality of tanks, wherein each tank has associated therewith at least two electrical contact members which, when the contents of the corresponding tank reach a given high level in the process of filling that tank, co-act to cause operation of automatic switching means controlling the starting of an electric motor which effects the change-over to the next phase of the cycle of operations of filling and emptying the tanks.

Yet another object of the invention is to effect simultaneous resetting of the inlet and outlet valves of a plurality of tanks by means of an electric motor which starts in response to the completion of one phase of a cycle of operations performed on material in the tanks, and stops automatically when the resetting of the valves has been effected.

By way of illustration, if there are three operations in the complete cycle and three or more tanks, the material in each tank tank undergoes these three operations in succession, while at any given time all the different operations are being performed simultaneously.

Control of the operations may be effected by devices comprising diaphragms which are sensitive to the pressure occasioned by the liquid or other flowing material attaining a given high level, such diaphragms being arranged to operate switch contacts, but it is preferred, in general, to make use of electrode-like contact members located to come into contact with the material in each tank.

The invention will now be more fully explained with reference to the annexed drawings wherein:

Figure 1 is a diagram showing the elements of a system for controlling the filling and emptying of three sewage tanks, and also includes a circuit diagram of the electrical system; and Figure 2 is a diagrammatic elevation partly in section of a controlling discharge valve which may be provided instead of an emptying pump shown in Figure 1.

Referring to Figure 1, a sewage treatment plant is shown which includes three closed metal tanks T, E and F of equal size. Each tank is fitted at the bottom with an inlet valve $Ti$, $Ei$ and $Fi$ and a discharge valve $Td$, $Ed$ and $Fd$ which are illustrated as mushroom valves with their stems projecting below the tanks. The said valves control communication between the internal spaces of the tanks T, E, F and spaces I and D in the bases of the tanks and connected respectively with an inlet manifold 60 and a discharge manifold 6. As indicated in the drawings, the three tanks T, E and F are arranged in line and at the same level, and the valves are arranged to be opened at appropriate phases of the cycle of operation by cams 1 on a cam shaft 2 driven from an electric motor 3 at the appropriate speed through reduction gearing 3a during change-over periods. When the valves are not lifted by the respective cams 1, they are closed by the pressure of the fluid in the tank. When the inlet valve of a tank is open, as shown at Fi, the sewage liquid is pumped into the tank F through the inlet valve Fi by a filling pump 58 running at constant speed. The sludge is drawn in through an inlet 59 and pumped into the supply manifold 60. Similarly when the discharge valve of a tank is open, as shown at Ed, the sewage liquid is pumped out by a pump 4 continuously rotated by a motor 5 and having its intake pipe connected to the discharge manifold 6 from all three of the tanks T, E, F.

The cycle of operation is such that each tank in turn is filled with the liquid, then its inlet and discharge valves are both maintained closed for a given dwell period, for example, 30 minutes, during which time the liquid in the tank is subjected to some treatment, such as heat treatment, and at the conclusion of that period, the emptying of the tank is started in order that it may afterwards be filled again with fresh liquid for treatment. Thus, the time of heat treatment is primarily governed by the speed of the filling pump 58.

In the drawings, the tank T is shown filled with fluid with both its valves Ti and Td closed, while the liquid in it is being heat-treated; the tank E with its discharge valve Ed open, is being emptied, and the tank F with its inlet valve Fi open, is being filled. The pumps 4, 58 operate at such a rate that the filling and emptying of a tank each occupy the same period as is necessary for the heat treatment in the filled tank.

Thus, the motor 3 operates intermittently, in the example considered, every 30 minutes, turning the shaft 2 at each operation, relatively quickly through an angle of 120 degrees, so that, for example, at the next operation following upon the position shown in the drawings, the tank T will have its discharge valve Td opened so that its contents can be pumped out; the tank E will have its inlet valve Ei opened and its discharge valve Ed closed, so that it can be slowly filled with fresh fluid, and the tank F will have its inlet valve Fi closed so that its contents can be treated for 30 minutes.

In order to control the rotation of the motor 3 and the change-over of the valves, a system is provided controlled by the level of the fluid in the tanks, and in fact each tank has a pair of electrodes 7, 8 mounted in electrically insulating bushes 56 which are tight to steam pressure so that the electrodes are insulated from each other and from the tank. The electrodes 7, 8 project downwardly through the cover of the tank for comparatively short distances into the tank. It will be noted that the electrodes 7 project further into the tanks than the electrodes 8. The reason for this, as will be better appreciated from the following description, is to prevent erratic operation should any turbulence occur inside the tanks. If the operation were erratic, it might be possible to start and stop the motor 3, leaving some of the valves partly open and partly closed. The electrodes 7 are each connected directly to one side of the secondary winding of a transformer Tt, Te, Tf supplied from an alternating current supply 9, 10, while the electrodes 8 are each connected to the other side of the secondary winding of the respective transformer, through the winding 11 of an associated electro-magnetic switch. Thus, since the liquid in the tank is electrically conductive, when a tank is filled, the liquid bridges the electrodes 7 and 8, so that the respective switch winding 11 is energised and draws up its plunger 12. The plunger 12 is connected to a see-saw member 13 which carries two mercury switches 14, 15. When the winding 11 is energised, as shown above the tank T, the arm 13 is horizontal and the contacts of both mercury switches 14, 15 are connected together. When the winding 11 is de-energised, as shown above the tanks E and F, the plunger 12 descends and draws the arm 13 into the inclined position, so that the mercury in each of the switches 14, 15 falls to the left-hand end of the tube and disconnects the contacts. Each switch 14 has its contacts connected between the respective shorter electrode 8 and the body of the metal tank T, E or F. Each of the other switches 15 has its left-hand contact connected to the starter 16 of the motor 3 which turns the shaft 2, and its right-hand contact connected to one segment t, e, f of a distributor switch, the rotary arm or brush b of which is connected by a conductor 17 to the side 10 of the alternating current supply, the other side 9 of which returns to the starter 16 through the conductor 18. The brush b is on a spindle 19 geared at 20 to the shaft 2, and the arrangement is such that at every change-over operation of the tank valves, the arm b is rotated through 120 degrees clockwise, so that at the next operation, for example, it is quickly swept over the segment f and comes to rest at the beginning of the segment e.

The cycle of operations is controlled by the tank F which is being filled at any particular time. As already explained, when the tank F is filled, it is kept in this condition for a period during which its contents undergo treatment. During this time, the tank T will be emptying and the tank E filling. As soon as the filling of the tank T is completed, as shown in the drawings, the fluid in it bridges the electrodes 7 and 8 and the winding 11 of the switch above the tank T is energised and its plunger 12 is drawn up into the position shown. The mercury switch 14 above the tank T then completes a holding circuit for the winding 11 from the secondary winding of the transformer Tt, through the conductor 21, through the winding 11, conductor 22, switch 14, conductor 23, the body of the tank T, the fluid in that tank, the electrode 7, conductor 24, back to the secondary winding of the transformer Tt. It will be noted that this holding circuit remains closed while the tank T is full and its contents are under treatment, and during the first part of the emptying of the tank until the fluid in it falls below the electrode 7. The second mercury switch 15 above the tank T is also closed and it completes a circuit to the motor starter 16 from the alternating current supply at 9 through the conductor 18, starter 16, conductor 25, switch 15 above the tank T, conductor 26, distributor segment t, brush b (which now rests on the segment t), the conductor 17, back to the alternating current supply at 10. Consequently, the motor 3 is started and turns the shafts 2 and 19 to set the tank valves into the position shown in the drawings, with the valves Td and Ti both closed and it rotates the brush arm b clockwise until it reaches the segment *f* in the position shown in the drawings. Thus, the brush *b* has now broken the circuit to the motor starter 16 described above, so that the motor 3 immediately stops, leaving the tank valves and the brush *b* at the setting shown in the drawings. Now the valves T*i*, T*d*, will remain closed for the period of the treatment, the tank E will be emptying for that same period, and the tank F will be filling for that same period. When the tank F is filled, the motor 3 will be started again in a similar way, shifting the brush *b* on to the segment *e* and resetting the valves in the bottoms of the tanks to keep the tank F filled for the desired period, to start the filling of the tank E and the emptying of the tank T. Thus, in a complete cycle, when the shafts 2 and 19 have made a complete revolution, each of the tanks T, E and F have in turn been filled, the filling of each occupying a period of 30 minutes, and then each tank has been emptied, occupying a third period of 30 minutes.

It may happen that when one tank, for instance the tank F, is filled, another tank, for instance the tank E, has not been completely emptied, or owing to the bridging of the electrodes 7, 8 the contents of a tank, for instance the tank T, that has been undergoing heat treatment, may commence discharging before that treatment has been fully completed. In order to deal with such contingencies, the following arrangement is provided designed to increase or reduce the speed of the pump 4 which is employed for emptying the tanks. As illustrated, the pump 4, is driven from the motor 5 which runs at constant speed, through a gearing of variable ratio which is under the control of a pair of electro-magnet windings DS, IS. The arrangement is such that, as shown diagrammatically in the drawings, if the winding DS receives an energising pulse, it causes the member 27 to move downwards carrying with it a friction pinion 28 which is thus moved nearer to the centre of the driving disc 29 and nearer the edge of the driven disc 30, so that the latter and the pump 4 are driven more slowly. On the other hand, if the winding IS receives an energising pulse, it draws the member 27 upwards somewhat, and increases the speed of the pump 4.

To provide for this operation, each of the tanks T, E and F has associated with it a pair of electro-magnetic switches or contactors 31, 32. The winding of each of the switches 31 is supplied from the alternating current mains 9, 10, through a suitable transformer 33, the secondary winding of which supplies the switch 31 through a circuit connected to the metal casing of the tank T, E or F, and to a third electrode 34 which extends almost to the bottom of the respective tank. Also each of the windings 32 is supplied from the alternating current mains 9 and 10 through a suitable transformer 35, the secondary winding of which is connected to the switch 32 through a circuit connected to the metal casing of the tank T, E, F, by the conductor 36, and connected to the shortest electrode 8 by the conductor 37. Thus, when any one of the tanks is filled and the fluid in it connects the electrode 8 to the casing of the tank, the respective switch 32 is energised, and when the tank is empty so that its contents fall below the electrode 34, the respective switch 31 is de-energised. Thus, in the position shown in the drawings, the tank T is filled and both of its switches 31 and 32 are energised so that, as shown, their upper contacts are closed. In the case of the tank E, the fluid has fallen below the electrode 8, so that its switch 32 is de-energised and its lower contacts closed, whereas the switch 31 is energised and its upper contacts closed, but as soon as the tank E has emptied to an extent such that the level of the material falls below the electrode 34, its switch 31 will be de-energised. The tank F which is being filled, is in the same condition as the tank E, so that its switch 31 is energised and its switch 32 is de-energised, but as soon as the tank F is filled to such an extent that the level of the material has reached the electrode 8, the fluid will cause its switch 32 to become energised.

In order to explain the operation of the system illustrated, assume that the tank F becomes filled to the predetermined level before the tank E becomes emptied. Then, as already mentioned, the switch 32 above the tank F becomes energised and pulls up its movable contact member 38 closing its upper contacts 39. The result of this is that a circuit is completed as follows: from the positive side of the battery 40, through conductor 41, contacts 39, 38 of switch 32 above the tank F, conductor 42, contacts 43, 44 of switch 31 above tank E to a segment 45 of a distributor DI which controls the increase of the speed of the pump 4, through the contact arm 46 of that switch which, as seen from the drawings, rests on the segment 45, through conductor 47 and the winding IS to the negative side of the battery 40. The winding IS is, therefore, energised and in the way already described, the speed of the pump 4 is increased to empty the tank E rather more quickly. The filling and discharging rates may not be completely equalized during the cycle which has just been completed, but, due to the increased discharge rate, the two rates will be equalized in the next cycle or in succeeding cycles.

If, on the other hand, the tank E is being emptied faster than the tank F is being filled, the liquid in the tank E leaves the electrode 34, de-energising the switch 31 above the tank E, so that its moving contact member 44 connects its lower contacts 48. There is then a circuit from the positive side of battery 40, through contacts 48 and 44 of the switch 31 associated with the tank E, through conductor 49, and the lower contacts 50 and the moving contact 38 of the switch 32 above the tank F which is not then energised, since that tank is not yet filled, and through conductor 51 to the segment 52 of a further distributor switch DD, which controls the decrease in speed of the emptying pump 4, then through the switch arm 53 and conductor 54 to the winding DS and the negative side of the battery 40. Thus, winding DS is energised and moves the member 27 to decrease the speed of the pump 4.

Again, if the material in the tank E leaves the electrode 34 at the same time as the material in the tank F reaches the electrode 8, no change in speed is needed, but in the way already mentioned, the switch 31 above the tank E and the switch 32 above the tank F are respectively released and energised simultaneously, so that the segment 45 of the distributor DI is disconnected from the battery 40 by the switch 31 above the tank E and the segment 52 of the distributor DD is disconnected from the battery 40 by the switch 42 above the tank F and no circuit is made through either the winding DS or the winding IS, and there is no adjustment of the gearing 28, 29, 30 through which the pump 4 is driven.

The distributors DI, DD are driven, as shown, through gearing 55 in step with the distributor b and the cam shaft 2 which actuates the tank valves, so that at the end of the phase of the cycle illustrated in the drawings, the switch arms 46 and 53 are respectively shifted on to the next segments 56 and 57 which are connected respectively to the contacts of the switch 32 above the tank E and the switch 31 above the tank T, which tanks have now respectively begun to fill and to empty. Thus, the operation goes on, the tank E taking the place of the tank F, and the tank T taking the place of the tank E, while the contents of the filled tank F are subjected to a period of treatment.

The system is, of course, susceptible to various modifications. For example, although in the treatment of sewage, it is found convenient to control the speed of the emptying pump 4, a similar result may be obtained by adjusting the speed of the filling pump in the inverse direction.

Again, the rate of emptying of the tanks T, E and F may be controlled by varying the degree of opening of a discharge valve as shown in Figure 2 inserted between the discharge manifold 6 and the sludge outlet 61 in the place of the discharge pump 4 shown in Figure 1. The degree of opening is controlled by the rising and falling of the plunger 62 within the body 63 of the valve. The plunger 62 is moved up and down by solenoids DS and IS which are connected in precisely the same way as illustrated in Figure 1. Thus, if the winding DS receives a current impulse, its plunger or armature d is drawn up, first to rock the bell-crank 69 about the pivot 70 carried on a sliding plate 71 so that the pawl 72 engages a toothed wheel 73. Then the pivot 70 is drawn upwards while the pawl 72 turns the wheel 73 one step in a clockwise direction so that the pinion 74 engaging the rack 75 on the valve stem 68 causes the valve stem 68 and plunger 62 to move down one step and the rate of flow of the sludge is slightly decreased. Also, if the winding IS receives a current impulse, the plunger s is lifted, the wheel 73 turned by one step in a counter-clockwise direction through a similar bell-crank 76, and the plunger 62 raised one step so that the rate of flow of the sludge is somewhat increased.

We claim:

1. A system for effecting co-ordinated control of cyclic operations on material capable of flowing, comprising a plurality of tanks, supply and discharge means governing respectively the supply of the material to said tanks and the discharge of same therefrom, level responsive control means associated with each of said tanks, each control means being operative to effect change-over to the next phase of a cyclic filling and emptying of said tanks whenever the material in such tank that is filling attains a given level therein, and means operative in response to the respective levels of the material in said tanks for varying the relative rates of filling and emptying said tanks, to ensure that filling to a predetermined extent of one of said tanks and emptying to a predetermined extent of another of said tanks occur substantially simultaneously.

2. A system for effecting co-ordinated control of cyclic operations on material capable of flowing, comprising a plurality of tanks, supply and discharge means governing respectively the supply of the material to said tanks and its discharge therefrom, change-over means effecting the change-over to the next phase of a cyclic filling and emptying of said tanks, electrically-operated means associated with each of said tanks and responding to cause actuation of said changeover means when the material in any one of said tanks reaches a predetermined level in the process of filling that tank, and means operative in response to the respective levels of the material in said tanks for varying the relative rates of filling and emptying said tanks to ensure that filling to a predetermined extent of one of said tanks and emptying to a predetermined extent of another of said tanks occur substantially simultaneously.

3. A system for effecting co-ordinated control of cyclic operations on fluid material, comprising a plurality of tanks, supply and discharge means governing respectively the supply of the material to said tanks and its discharge therefrom, a source of electrical supply, a plurality of valves associated with said tanks for effecting change-over to the next phase of a cyclic filling and emptying of said tanks, an electric motor connected to operate said valves, an automatic switch governing the operation of said motor, a pair of contact members associated with each of said tanks and connected in circuit with said automatic switch; said contact members being electrically connected together by the material in the corresponding tank attaining a predetermined level in the process of filling that tank, whereupon said automatic switch is actuated and said motor effects the change-over; and means operative in response to the respective levels of the material in said tanks for varying the relative rates of filling and emptying said tanks to ensure that filling to a predetermined extent of one of said tanks and emptying to a predetermined extent of another of said tanks occur substantially simultaneously.

4. A system for effecting co-ordinated control of cyclic operations on fluid material, comprising a plurality of tanks, supply and discharge means governing respectively the supply of the material to said tanks and its discharge therefrom, a source of electrical supply, a plurality of valves associated with said tanks for effecting change-over to the next phase of a cyclic filling and emptying of said tanks, an electric motor connected to operate said valves, an electromagnetically-operated switch controlling the starting of said motor, a pair of electrodes associated with each of said tanks and extending downwardly from the top of the tanks into the interior thereof and connected in circuit with the winding of said switch; said pair of electrodes being connected together by the material in the corresponding tank reaching a given level in the process of filling that tank, whereupon said automatic switch is actuated and said motor effects the change-over; and means operative in response to the respective levels of the material in said tanks for varying the relative rates of filling and emptying said tanks to ensure that filling to a predetermined extent of one of said tanks and emptying to a predetermined extent of another of said tanks occur substantially simultaneously.

5. A system for effecting co-ordinated control of cyclic operations on fluid material, comprising a plurality of tanks having conducting bodies, supply and discharge means governing respectively the supply of the material to said tanks and its discharge therefrom, a source of electrical supply, a plurality of valves associated with said tanks for effecting change-over to the next phase of a cyclic filling and emptying of said tanks, an electric motor connected to operate said valves, electromagnetically-operated switching means associated with each of said tanks to control the starting of said motor, said switching means comprising a pair of mercury switches, a pair of contact members associated with each of said tanks and co-operating with said switching means; said contact members being connected together by the material in the corresponding tank attaining a given level in the process of filling that tank, whereupon the winding of said switching means is energised to close both of said mercury switches one of which completes a circuit to start said motor and the other of which completes a holding circuit for the winding of said switching means passing through one of said contact members and the conducting body of the tank; and means operative in response to the respective levels of the material in said tanks for varying the relative rates of filling and emptying said tanks to ensure that filling to a predetermined extent of one of said tanks and emptying to a predetermined extent of another of said tanks occur substantially simultaneously.

6. An electrically-operated system for effecting co-ordinated control of cyclic operations on fluid material, comprising a plurality of tanks, means for supplying the material to, and means for effecting discharge of the material from, said tanks, an inlet valve and an outlet valve associated with each individual tank and governing the passage of the material into and out of said tanks, a source of electrical supply, an electric motor driven means to effect resetting of all said inlet and outlet valves in a predetermined sequence so that at least one of said tanks is filling while another is emptying, electrically operated switching means controlling the starting of said motor, a pair of electrical contact members mounted in the interior of each of said tanks and included in circuits for energizing said switching means, whereby the attainment of a given level of material in the process of filling any one of said tanks results in completion of a circuit between the corresponding pair of said contact members to actuate said switching means and start said motor, one contact of each pair of contacts in said tanks extending to a lower level than the other contact, and a holding circuit for said electrically operated switching means completed through the fluid material to said one contact and through a normally open contact on said switching means.

7. An electrically-operated system for effecting co-ordinated control of cyclical operations on fluid material, comprising a plurality of tanks, means for supplying the material to, and means for effecting discharge of the material from, said tanks, an inlet valve and an outlet valve associated with each individual tank and governing the passage of the material into and out of said tanks, a source of electrical supply, an electric motor to effect resetting of all said inlet and outlet valves in a predetermined sequence so that at least one of said tanks has its inlet valve open while at least one of the other tanks has its outlet valve open, switching means controlling the starting of said motor, a pair of electrical contact members mounted in the interior of each of said tanks and co-operating with said switching means, whereby the attainment of a given level of material in the process of filling any one of said tanks results in completion of a circuit between the corresponding pair of said contact members to actuate said switching means and start said motor, and a rotary distributor switch connected in the starting circuit of said motor, said distributor switch serving to interrupt said motor circuit when said motor has reset said valves for the next phase of the cycle of operations and also to prepare said motor circuit to be controlled by the level of the contents of the next one of said tanks to become filled.

8. A system for effecting co-ordinated control of cyclical operations on fluid material, comprising a plurality of tanks, means for supplying the material to, and means for effecting discharge of the material from, said tanks, an inlet valve and an outlet valve associated with each individual tank and governing the passage of the material into and out of said tanks, a source of electrical supply, an electric motor to effect operation of said inlet and outlet valves to the next phase of the cycle of operations, the inlet valve of at least one of said tanks being open while the outlet valve of another tank is open in each phase of said cycle, a pair of contact members associated with each of said tanks and connected so that said motor is energised when a circuit is completed between said pair of contact members due to the material reaching a given level in the process of filling the corresponding tank, rotary switching means actuated in step with said motor, adjustment means associated with said rotary switching means and responsive to a difference between the rates of filling and emptying said tanks for adjusting the relative rates of filling and emptying of said tanks, and an additional contact member associated with each of said tanks and connected to co-operate with one of the said pair of contact members appertaining to another of said tanks, whereby circuits are controlled to cause said adjustment means to effect substantial simultaneity between the filling to a predetermined point of one of said tanks and the emptying to a predetermined point of another of said tanks.

9. A system for effecting co-ordinated control of cyclical operations on fluid material, comprising a plurality of tanks, a pump for supplying the material to, and a pump for emptying the material from, said tanks, means for driving said pumps continuously, inlet and outlet valves associated with each of said tanks to control the filling and emptying thereof, control means associated with each of said tanks and operative to effect change-over to the next phase of a cyclical filling and emptying of said tanks whenever the material in any one of said tanks reaches a given level in the process of filling that tank, one of said tanks having its inlet valve open while another tank has its outlet valve open, at least two electrical contact members mounted within each of said tanks at high and low levels respectively, and means responsive to the actuation of circuits controlled by the high-level contact member of one of said tanks and the low-level contact member of another of said tanks to alter the speed of one of said continuously driven pumps and thereby ensure that filling of one of said tanks to a predetermined point substantially coincides with emptying of another of said tanks to a predetermined point.

10. A system for effecting co-ordinated control of cyclical operations on fluid material, comprising a plurality of tanks, a pump for supplying the material to, and a pump for emptying the material from, said tanks, means for driving said pumps continuously, inlet and outlet valves associated with each of said tanks to control the filling and emptying thereof, control means associated with each of said tanks and operative to effect change-over to the next phase of a cyclical filling and emptying of said tanks whenever the material in any one of said tanks reaches a given level in the process of filling that tank, one of said tanks having its inlet valve open while another tank has its outlet valve open, at least two electrical contact members mounted within each of said tanks at high and low levels respectively, a pair of electromagnetic windings associated with the pump which empties the material from said tanks and arranged to be energised through circuits controlled respectively by the high-level contact member of one of said tanks, and by the low-level contact member of another of said tanks, adjustable gearing means between said emptying pump and the driving means therefor, and means for controlling said gearing by said electromagnets whereby if the filling of one of said tanks is proceeding at a rate different from that of the emptying of another of said tanks, one of said windings is energised to cause said adjustable gearing means to effect the appropriate change in speed of said emptying pump.

11. A system for effecting co-ordinated control of cyclical operations on fluid materials, comprising a plurality of tanks, a pump for supplying the material to, and a pump for emptying the material from, said tanks, means for driving said pumps continuously, inlet and outlet valves associated with each of said tanks to control the filling and emptying thereof, control means associated with each of said tanks and operative to effect change-over to the next phase of a cyclical filling and emptying of said tanks whenever the material in any one of said tanks reaches a given level in the process of filling that tank, one of said tanks having its inlet valve open while another tank has its outlet valve open, at least two electrical contact members mounted within each of said tanks at high and low levels respectively, a pair of distributor switches controlling circuit connections between the high-level contact member of one of said tanks which is being filled and by the low-level contact member of another of said tanks which is being emptied, and driven intermittently by said motor, a pair of electromagnetic windings connected in circuit respectively one with each of said distributor switches, variable speed gearing between said emptying pump and the driving means therefor, said variable speed gearing being adjusted by the energisation of one of said electromagnetic windings to increase the speed of said emptying pump and by the energisation of the other of said electromagnetic windings to decrease the speed of said emptying pump.

12. A floatless electrically-operated system for effecting co-ordinated control of cyclical operations on fluid material, comprising a plurality of tanks, means for supplying the material to, and means for effecting discharge of the material from said tanks, an inlet valve and an outlet valve associated with each individual tank and governing the passage of the material into and out of said tanks, a source of electrical supply, and electric motor to effect resetting of all said inlet and outlet valves simultaneously so that at least one of said tanks has its inlet valve open while another tank has its outlet valve open, automatic switching means controlling the starting of said motor, a pair of electrical contact members mounted in the interior of each of said tanks and co-operating with said switching means, whereby the attainment of a given level of material in the process of filling any one of said tanks results in completion of a circuit between the corresponding pair of said contact members to actuate said switching means and start said motor, a rotary distributor switch connected in the starting circuit of said motor and driven intermittently by said motor, said distributor switch serving to interrupt said motor circuit when said motor has reset said valves for the next phase of the cycle of operations, and also to prepare said motor circuit to be controlled by the level of the material in the next one of said tanks to become filled, high-level and low-level contact members within each of said tanks, a pair of further distributor switches driven in step with said first-mentioned distributor switch and connected in circuits controlled by said high-level and low-level contact members, and means co-operating with said further pair of distributor switches to vary the rate of change of level of the material in one of said tanks under the control of the position of the level of the material in another of said tanks, so that the filling to a predetermined extent of one of said tanks is caused to occur substantially simultaneously with the emptying to a predetermined extent of another of said tanks.

13. A system for effecting co-ordinated control of cyclical operations on sewage material, comprising at least three tanks, means for supplying the material to, and means for discharging the material from, said tanks, inlet and outlet valves associated with each of said tanks to control the filling and emptying thereof, control means for said valves operative to effect change-over to the next phase of a cyclic filling and emptying of said tanks whenever the material in any one of said tanks reaches a given high-level in the process of filling said tank, one of said tanks having its inlet valve open while another tank has its outlet valve open, a high-level contact member and a low-level contact member located in each of said tanks, and auxiliary control means connected in circuit with said contact members and controlled at any time by the high-level contact member of one of said tanks which is being filled and by the low-level contact member of another of said tanks which is being emptied, said auxiliary control means being operative to alter the relative rates of filling and of emptying of said tanks so that the filling of one of said tanks to a predetermined level occurs substantially at the same time as the emptying to a predetermined extent of another of said tanks.

14. A system for effecting co-ordinated control of cyclical operations on fluid material, comprising a plurality of tanks, a pump for supplying the material to, and a pump for emptying the material from, said tanks, means for driving said pumps continuously, inlet and outlet valves associated with each of said tanks to control the filling and emptying thereof, control means associated with each of said tanks and operative to effect change-over to the next phase of a cyclical filling and emptying of said tanks whenever the material in any one of said tanks reaches a given level in the process of filling that tank, one of said tanks having its inlet valve open while another tank has its outlet valve open, and co-operating means associated with at least two of said tanks and responsive to a difference between the rate of change of the level of material in one of said tanks, which is being filled, and the rate of change of the level of the material in another of said tanks, which is being emptied, to cause the filling to a predetermined extent of said first-mentioned tank to coincide substantially with the emptying to a predetermined extent of said other tank.

15. A system for effecting co-ordinated control of cyclical operations on fluid material, comprising a plurality of tanks, a pump for supplying the material to, and a pump for emptying the material from, said tanks, means for driving said pumps continuously, inlet and outlet valves associated with each of said tanks to control the filling and emptying thereof, control means associated with each of said tanks and operative to effect change-over to the next phase of a cyclical filling and emptying of said tanks whenever the material in any one of said tanks reaches a given level in the process of filling that tank, one of said tanks having its inlet valve open while another tank has its outlet valve open, three electrical contact members mounted at three different levels in each of said tanks, one of said contact members being located at a high level, another at a low level, and the other of said contact members at an intermediate level in each of said tanks, electrically-operated means responsive to the relative positions of the levels of the material with respect to the high-level contact member of one of said tanks and the low-level contact member of another of said tanks to cause the filling of one of said tanks to a predetermined point to occur practically simultaneously with the emptying of another of said tanks to a predetermined point, and means co-operating with the high-level and intermediate-level contact members of each of said tanks and said control means to ensure the proper functioning of said control means.

16. A system for effecting co-ordinated control of cyclic operations on material capable of flowing, comprising at least two tanks, supply and discharge means governing respectively the supply of the material to said tanks and the discharge of same therefrom, means for cyclically controlling said supply and discharge means to fill and empty said tanks in a succession of cycles, one tank being filled while another tank is being emptied, means for varying the rate of flow of material with respect to one of said tanks, level responsive means for each of said tanks, and means controlled by said level responsive means for controlling said flow varying means to cause the material in one of said tanks to reach a predetermined level at substantially the same time that the material in the other tank reaches a predetermined level therein.

17. In a system for controlling operations on material capable of flowing, the combination of at least two tanks, means for supplying material to one of said tanks and for discharging material from the other tank, control means operated in response to and when a predetermined level is reached in one tank, control means operated in response to and when a predetermined level is reached in the other tank, and means responsive to the joint operation of said control means and so constructed and arranged that the flow of material with respect to one of said tanks is increased when the first mentioned control means operates in advance of the second mentioned control means and so that the said flow is decreased when the operation of said control means is in the reverse order.

18. A system for effecting coordinated control of cyclic operations on material capable of flowing, comprising at least three tanks, an inlet and an outlet valve for each tank through which material is supplied to and discharged from said tanks, a controller having three operating positions for setting said valves to successively fill, dwell, and empty each tank, the valves of the different tanks being controlled in coordinated relation so that one tank is being filled while another tank is being emptied and a third tank is dwelling, level responsive means for each of said tanks, and means controlled by said level responsive means of the tank being filled for operating said controller to the next position when the material in the tank being filled reaches a predetermined level.

19. A system for effecting coordinated control of cyclic operations on material capable of flowing, comprising a plurality of tanks, an inlet and an outlet valve for each tank through which material is supplied to and discharged from said tanks, a controller having a plurality of operating positions for setting said valves to successively fill and empty each tank, the valves of the different tanks being controlled in coordinated relation so that one tank is being filled while another tank is being emptied, an electric motor for operating said controller, a normally open energizing circuit for said motor, level responsive means for each of said tanks, means controlled by said level responsive means of the tank being filled for completing the circuit of said motor to operate said controller to its next position when the material in the tank being filled reaches a predetermined level, and means controlled by the operation of said controller for interrupting said motor energizing circuit and for preparing a circuit for the closing of said energizing circuit by the level responsive means of the tank which has been conditioned to be filled.

20. A system for controlling the cyclic filling with a fluid material and emptying of at least three vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, and an electrical control device associated with each of said vessels and responsive to the level of material therein, said device being in operative connection with each of said inlet valves and with each of said outlet valves to actuate certain of said valves on the material attaining a predetermined level in any one of said vessels, to close the inlet valve to the vessel last filled, to open the discharge valve from the vessel filled at the immediately previous actuation and to open the inlet valve and to close the discharge valve of the vessel last emptied.

21. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a distributor switch driven by said motor through one step at each actuation of said valves and connected in said circuit connections to said motor, a plurality of electrical controllers each associated with one of said vessels and responsive to the level of the material therein, and a plurality of electromagnetic switches each actuated by one of said controllers when the level in the tank associated therewith reaches a predetermined amount, said switches serving when actuated to energize said motor through different segments of said distributor switch and to cause operation of said motor through one step to effect a changeover of said valves to empty one tank and fill another, and said distributor when actuated through one step interrupts the circuit of said motor and prepares a circuit for energizing said motor through another segment of said distributor switch when the level in another of said tanks reaches a predetermined amount.

22. A system for controlling the cyclic filling with a fluid material and emptying of a plurality of vessels, comprising in combination with said vessels, an inlet conduit and an outlet conduit for each of said vessels, means for feeding the fluid material to each of said inlet conduits, a plurality of inlet valves each controlling one of said inlet conduits, a plurality of discharge valves each controlling one of said outlet conduits, an electric motor in operative connection with said inlet valves and with said discharge valves, a source of electrical supply for said motor, circuit connections between said source of supply and said motor, a plurality of high level electrical controllers each associated with one of said vessels and responsive to the level of material therein, a plurality of low level electrical controllers each associated with one of said vessels and responsive to the level of the material therein, a plurality of electromagnetic switches each actuated by one of said high level controllers when the level in the associated vessel reaches a predetermined high value for energizing said motor to cause actuation of the latter through one step to effect a change-over of said inlet and discharge valves to empty one vessel and to fill another, a plurality of electromagnetic switches each actuated by one of said low level controllers when the level in the associated vessel reaches a predetermined low value, interlocking connections between contacts of said switches for said first-mentioned electrical controllers and contacts of the switches for said second-mentioned electrical controllers, and means controlled through said interlocking connections for adjusting the relative rates of filling of one of said vessels and of emptying of another of said vessels which is being emptied when said first-mentioned vessel is being filled.

WILLIAM KING PORTEOUS.
WILLIAM THOMAS MARCHMENT.